Feb. 14, 1939.  H. FREEDMAN  2,147,403

DENTAL BRIDGEWORK AND METHOD OF MAKING SAME

Filed Nov. 21, 1936

INVENTOR
HYMAN FREEDMAN
BY
Mueller & Kuhl
ATTORNEYS

Patented Feb. 14, 1939

2,147,403

UNITED STATES PATENT OFFICE 2,147,403

DENTAL BRIDGEWORK AND METHOD OF MAKING SAME

Hyman Freedman, Brooklyn, N. Y.

Application November 21, 1936, Serial No. 112,033

3 Claims. (Cl. 32—9)

This invention relates to improvements in dental bridgework and has particular reference to an artificial tooth, its mounting and the method of making the same.

Heretofore, it has been common practice, as exemplified in the well known Steele construction, to provide a backing for an artificial tooth on which is formed a post in parallelism to the backing proper and adapted to be cemented in a correspondingly formed recess or cavity in the facing of the tooth. Such construction permits of replacement of a broken facing by removal of the portions of the latter adhering to the backing, and the mounting of a new facing on the post and its attachment thereto, again by the use of cement; such mounting being accomplished by a sliding movement of the facing onto the post.

In the art of constructing dental bridgework, the use of solder in securing the teeth in position has come to be recognized as having many advantages over other binding elements such as cement, mainly because solder effects a more cohesive binding action. However, a bridgework originally assembled with solder necessitates the removal of the bridge when making a replacement of a broken facing therein. Such removal, particularly when the bridge is a permanent one, is likely to result in a distortion of the securing elements utilized in mounting the bridge in position in the mouth, and when this occurs it is often necessary to rebuild the bridge, or, at least, the proper replacement thereof is made extremely difficult.

By the present invention, it is proposed to combine the advantages of the well known Steele construction in which only cement is employed as a binding element, with the acknowledged advantages obtained by the use of solder in originally mounting a facing on a backing when a bridgework is being constructed. To this end, the invention contemplates the fusing of a facing onto a matrix which constitutes a portion of the backing in the completed bridgework, and which is provided with a hollow post, or its equivalent, that is imbedded in the facing during the fusing of the latter, the backing being completed by flowing solder onto the back of the matrix and through the same so as to fill the cavity formed by said post. The cohesion between the solder and the matrix, including the inner wall of said post, thereby forms a rigid construction upon which a new facing, such as the standard Steele type, may be readily mounted in the customary manner in the event of the breakage of the original facing.

Thus, as long as the bridgework remains in its original state and no facing becomes broken, the same will have incorporated therein all of the inherent advantages in the use of solder in mounting the facings in position.

The inventive idea involved is capable of receiving a variety of expressions one of which, for purposes of illustration, is shown in the accompanying drawing, wherein.

In carrying the invention into effect a matrix 6 is stamped, or otherwise formed, from a sheet of precious metal, such as platinum, of a thickness approximating one one-thousandth of an inch. In forming this matrix, the same is provided at approximately its vertical center with a hollow post 7 extending from a point above the lower extremity of the matrix to the upper edge thereof. The upper end of the post is open while the lower end is closed as indicated at 8 and said closed end forms a downwardly projecting portion which is adapted to be seated in the usual recess formed in a replacement facing such as that provided in the standard Steele construction. In accordance with the present invention, communication between the rear face of the matrix and the cavity formed by the hollow post 7 is established, preferably, by the formation of a narrow longitudinally extending slot or opening 9 beginning at the bottom of the post where the same merges into the main portion of the matrix and terminating at the upper end of the post, said slot being provided for the purpose of admitting a binding element, such as solder, into said cavity to fill the same when the tooth is being mounted on a bridge. The formation of the post 7 on the matrix is such that its longitudinal axis will be in parallelism with the matrix proper so that when a replacement is mounted in position the post may be readily fitted into the cavity of the replacement and then cemented thereto in the usual manner. The matrix 6 may, if desired, be further provided with a series of apertures 10 for a purpose which will presently appear.

Figure 1:
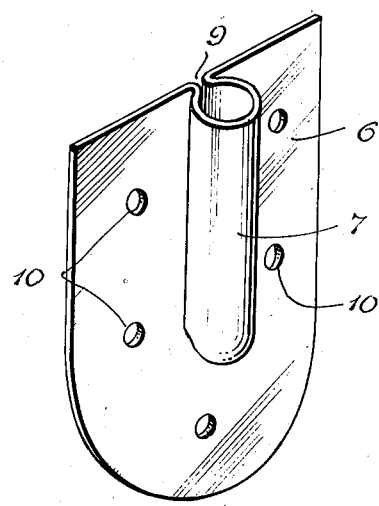
Figure 1 is a perspective view of a matrix constituting a portion of the backing of a tooth in its completed state.
Figure 2:
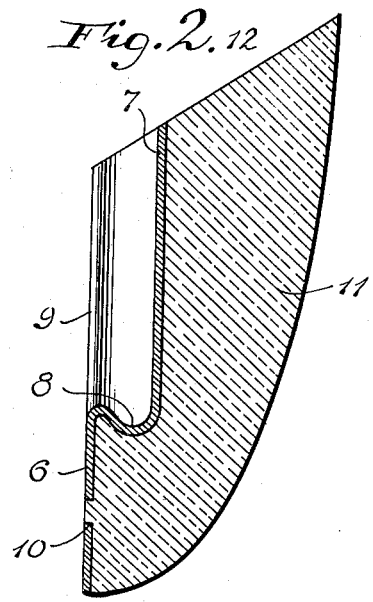
Figure 2 is a vertical longitudinal section through a facing after the same has been affixed to the matrix during the molding of the facing.
Figure 3:
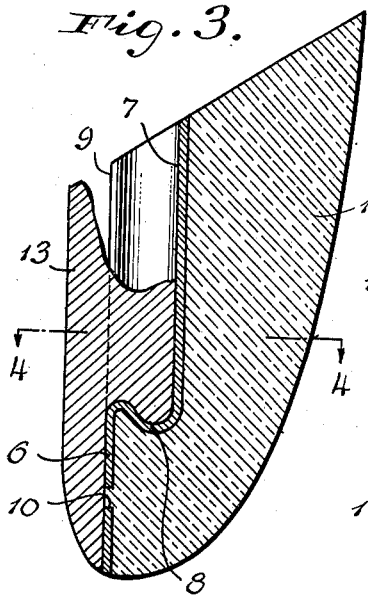
Figure 3 is a similar view partly broken away showing the finished tooth with the backing completed by flowing solder onto the rear surface of the matrix and into the cavity formed by the hollow part thereof.
Figure 4:
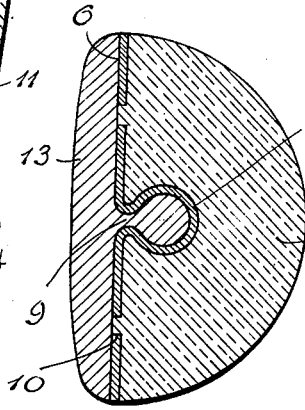
Figure 4 is a section on the line 4—4 of Figure 3.

Following the procedure of the present invention, a matrix 6 is placed in a form and a material, such as porcelain, is poured or fused into said form to mold the facing 11 onto the front face of the matrix with the post 7 embedded in the material and its upper open end terminating flush with the ridge lap 12 of the facing so that none of the material of the latter will enter the cavity of the post. In thus fusing the facing, a fusion takes place between the matrix and the porcelain which results in practically a unitary structure when the tooth is completed. During the fusing process, some of the material of the facing 11 enters the apertures 10 in the matrix to enhance the union between the two materials and assist in rigidly anchoring the facing to the matrix. The foregoing steps in the formation of a tooth produce the construction shown in Figure 2 of the drawing and the tooth is now ready for mounting on a bridgework.

After properly positioning the tooth on the bridgework, a binding element, preferably solder in a liquid state, is applied to the rear of the exposed face of the matrix 6 which may, or may not, cover the rear surface of the facing 11. In thus applying the solder, the same will flow through the opening or slot 9 into the cavity of the post 7 and fill the same up to the open end thereof which is coincident with the ridge lap 12 of the facing. After hardening, the solder will complete the backing of the tooth and reenforce the post 7 so as to form the same into a solid and rigid structure upon which a replacement facing may be readily mounted by sliding the same onto the post with the latter engaging in the usual recess or cavity in said replacement.

Figure 5:
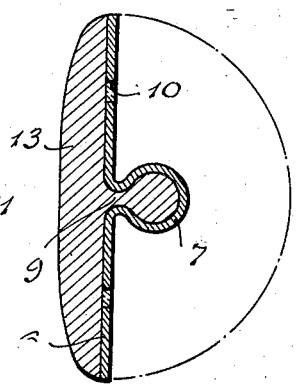
Figure 5 is a view similar to Figure 4 indicating, in full lines, the portion of the tooth remaining after the facing, indicated in dotted lines, has been removed.

Should it become necessary to effect a replacement of a broken facing the same can be chipped off without removing a permanent bridge thus leaving the structure indicated in full lines in Figure 5. In this connection it is to be noted that the removal of the broken facing is facilitated by reason of the fact that none of the material of the facing is in contact with the solder of the backing due to the complete closure of the bottom of the post and the termination of the surface 12 at the upper end of said post. After complete removal of the broken facing, the replacement is then mounted in position, as above described, with cement introduced into the cavity of the replacement so as to embed the post of the backing therein and thus bind the new facing in position.

What is claimed is:

1. The method of making an artificial tooth and fusing the same in a dental bridgework, which consists in molding the facing of the tooth onto a surface of a matrix and, while so fusing the facing, forming a cavity therein by utilizing a portion of said matrix, and thereafter securing said facing and matrix in a bridgework by flowing solder onto the back of said matrix and through said back into said cavity.

2. As a new article of manufacture, an artificial tooth comprising a matrix having a hollow post provided with a longitudinal opening and a closed and an open end combining to form a cavity in said post for the reception of a binding element, said post having communication with one surface of said matrix through said opening for the admission of said binding element into said cavity, and a facing fused on the other surface of said matrix and having said post embedded therein with the open end of the latter terminating flush with the ridge lap of said facing.

3. In a bridgework construction, an artificial tooth comprising a backing partially formed by a matrix having a hollow post thereon provided with a closed inner end, said post having a longitudinal slot communicating with a surface of the matrix for the admission of liquid solder into said post, a facing fused on the opposite surface of the matrix with said post embedded therein so that its entire surface is in intimate contact with said facing, and a binding element of solder applied to the first named surface of said matrix and fusible therewith to complete said backing, said solder being introduced through said slot in liquid form so as to completely fill said post and fuse directly with the interior surface thereof.

HYMAN FREEDMAN.